US007020539B1

(12) United States Patent
Kovacevic et al.

(10) Patent No.: US 7,020,539 B1
(45) Date of Patent: Mar. 28, 2006

(54) SYSTEM AND METHOD FOR FABRICATING OR REPAIRING A PART (75) Inventors: Radovan Kovacevic, Plano, TX (US); Michael E. Valant, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 66 days.

(21) Appl. No.: 10/649,925

(22) Filed: Aug. 25, 2003

Related U.S. Application Data (60) Provisional application No. 60/414,639, filed on Oct. 1, 2002.

(51) Int. Cl.
*G06F 19/00* (2006.01)
(52) U.S. Cl. ............... 700/166; 700/98; 700/118; 700/123; 700/166; 700/179
(58) Field of Classification Search ............... 700/95, 700/97, 98, 105, 108, 109, 110, 117, 118, 700/119, 123, 159, 160, 166, 169, 174, 179, 700/182, 245
See application file for complete search history.

(56) References Cited

U.S. PATENT DOCUMENTS

| | | | |
|---|---|---|---|
| 6,122,564 A | 9/2000 | Koch et al. | 700/123 |
| 6,188,041 B1 | 2/2001 | Kim et al. | 219/121.63 |
| 6,311,099 B1 | 10/2001 | Jasper et al. | 700/166 |
| 6,349,600 B1 * | 2/2002 | Davies et al. | 73/660 |
| 6,391,251 B1 | 5/2002 | Keicher et al. | 419/7 |
| 6,401,001 B1 | 6/2002 | Jang et al. | 700/118 |
| 6,459,951 B1 | 10/2002 | Griffith et al. | 700/166 |

(Continued)

FOREIGN PATENT DOCUMENTS

JP 11179578 A 7/1999

(Continued)

OTHER PUBLICATIONS

B. Grünenwald et al., "*New Technological Developments in Laser Cladding*", Proceedings of the International Congress on Application of Lasers and Electro-Optics (ICALEO 1993), pp. 934-944.

(Continued)

*Primary Examiner*—Leo Picard
*Assistant Examiner*—Charles Kasenge
(74) *Attorney, Agent, or Firm*—Baker Botts L.L.P.

(57) ABSTRACT

According to one embodiment of the invention, a system for fabricating a part includes a computer operable to control the fabrication of a three-dimensional part using a solid CAD model, a deposition station operable to deposit successive two-dimensional layers of material to fabricate the three-dimensional part, and a machining station operable to remove at least a portion of one or more of the deposited two-dimensional layers of material. The deposition station includes a substrate on which to fabricate the three-dimensional part, a welding-based deposition system having a welding torch, a laser-based deposition system having a laser head, a plasma powder cladding system having a plasma torch, and a multi-axis robot operable to, when directed by the computer, utilize one of the welding-based deposition system, laser-based deposition system, and plasma powder cladding system to deposit any of the two-dimensional layers of material. The machining station includes a multi-axis milling machine and an automatic tool changer. The milling machine is operable to, when directed by the computer, select from a plurality of machining tools associated with the automatic tool changer for use in the milling machine.

28 Claims, 8 Drawing Sheets

U.S. PATENT DOCUMENTS

| | | |
|---|---|---|
| 6,526,327 B1 * | 2/2003 | Kar et al. ............... 700/119 |
| 6,580,959 B1 | 6/2003 | Mazumder ............... 700/121 |
| 6,638,787 B1 | 10/2003 | Buchin et al. ............. 438/75 |
| 2002/0147521 A1 * | 10/2002 | Mok et al. ............... 700/159 |
| 2004/0107019 A1 | 6/2004 | Keshavmurhty et al. .... 700/118 |

FOREIGN PATENT DOCUMENTS

WO     WO 03/070414 A1    8/2003

OTHER PUBLICATIONS

Lli et al., "*Sensing, Modelling and Closed Loop Control of Powder Feeder for Laser Surface Modification*", Proceeding of the International Congress on Applications of Lasers and Electro-Optics (ICLEO 1993), pp. 965-974.

F. Meriaudeau et al., "*Acquisition and Image Processing System Able to Optimize Laser Cladding Process*", From the Proceeding of ICSP '96, Laboratoire GERE—Université de Bourgogne, France, pp. 1628-1631, 1996.

William H. Hofmeister et al, "*Video Monitoring and Control of the Lens Process*", Proceedings of AWS 9th International Conference on Computer Technology in Welding, 1998, pp. 187-196.

Ivan S. Kmecko et al., "*Influence of Geometrical Factor on Heat Transfer Rate During GTAW for Welding-Based Deposition*", Proceedings of Free Symposium on Nontraditional Manufacturing Research and Applications, the 2001 International Mechanical Engineering Conference, Nov. 11-16, 2001., New York, N.Y., (9 pages).

D. Hu et al., "*Improving Solid Freeform Fabrication by Laser-Based Additive Manufacturing*", Research Center for Advanced Manufacturing, Southern Methodist University, Richardson, Texas, USA, © ImechE, 2002, Proc. Instn Mech. Engrs vol. 216 Pat B: J. Engineering Manufacturing, pp. 1253-1264.

D Hu et al., "*Modelling and Measuring the Thermal Behavior of the Molten Pool in Closed Loop Controlled Laser-Based Additive Manufacturing*", Research Center for Advanced Manufacturing, Southern Methodist University, © ImechE, 2003, Proc. Instn Mech. Engrs vol. 217 Pat B: J. Engineering Manufacturing (12 pages).

Dongming Hue et al., "*Sensing, Modeling and Control for Laser-Based Additive Manufactures*", International Journal of Machine Tools & Manufacture 43 (2003) pp. 51-60.

\* cited by examiner

SYSTEM AND METHOD FOR FABRICATING OR REPAIRING A PART

CROSS-REFERENCE TO RELATED APPLICATION

This application claims the benefit of Ser. No. 60/414,639, entitled "POWDER DELIVERY SYSTEM," filed provisionally on Oct. 1, 2002.

TECHNICAL FIELD OF THE INVENTION

This invention relates generally to the field of rapid manufacturing and, more specifically, to a system and method for fabricating or repairing a part.

BACKGROUND OF THE INVENTION

Solid Freeform Fabrication ("SFF") is a set of manufacturing processes that produce complex solid objects directly from geometric models without specific part or tooling information. SFF builds up 3D objects by successive 2D layer deposition. Objects are sliced into 2D thin layers and each layer is built by various deposition or forming processes. Deposition methods may include solidification of liquid resins with ultraviolet radiation, such as stereolithography, sintering of powders with laser scans, such as selective laser sintering, and extrusion of heated thermoplastic polymers, such as fused deposition modeling. Subsequent layers are then deposited and bonded onto the previous layers until the final approximated 2½ D objects are constructed.

These additive SFF techniques exhibit some advantages over traditional manufacturing methods. First, complex objects can be easily built; 3D objects are decomposed into 2D layers, and planning in the 2D domain is relatively simple. Second, no custom fixtures are required; traditional machining operations demand sophisticated fixturing techniques for complex objects. Third, build time is greatly reduced; parts are often completed within a few hours on up to a couple of days, in contrast to conventional processes that may take few weeks, months or longer.

However, several disadvantages can also be observed due to the nature of layered processing. First, the surface finish of completed parts is poor; parts exhibit well-known stair-step effects along the build direction. In addition, the shrinkage factor for the chosen material has to be considered during planning. Second, material choice is limited. Finally, material integrity is hard to achieve for engineering applications; constraints on material selection and geometric preservation prohibit parts built with common engineering materials. In addition, the intrinsic behavior of such fabrication methods makes materials anisotropic along the build direction. Applications of additive SFF processes are often limited to look-and-feel prototypes, form-fitting for assembly tests, or as an intermediate means for other manufacturing processes, such as patterns for investment casting. Metal parts with good surface quality, accurate dimensions, and high structural strength cannot be produced directly with the above named rapid prototyping techniques.

SUMMARY OF THE INVENTION

In the last several years, a number of thermal deposition techniques, including thermal spraying, 3D welding, and 3D laser cladding have been used to create fully dense metal parts. An important issue in applying a thermal deposition technique for the SFF of metallic parts is to control the thermal gradients caused by fusing molten droplets onto previously deposited layers. Thermal spraying creates molten droplets with relatively small diameters (about 50 microns) which do not possess enough heat to re-melt the underlying surface. The bond between the consecutive layers is mechanical where adhesive and cohesive strength are relatively low. In the classical welding deposition approach, metallurgical bonds are formed. But the large heat transfer affects the shape of the underlying material. 3D laser cladding or laser-based additive manufacturing is usually done with metal powder. This process characteristically yields a very thin build-up layer and a small heat-affected zone. However, this process as a SFF method is limited by the size of the parts, the deposition rate, and high cost.

Therefore, according to one embodiment of the invention, a system for fabricating a part includes a computer operable to control the fabrication of a three-dimensional part using a solid CAD model, a deposition station operable to deposit successive two-dimensional layers of material to fabricate the three-dimensional part, and a machining station operable to remove at least a portion of one or more of the deposited two-dimensional layers of material. The deposition station includes a substrate on which to fabricate the three-dimensional part, a welding-based deposition system having a welding torch, a laser-based deposition system having a laser head, a plasma powder cladding system having a plasma torch, and a multi-axis robot operable to, when directed by the computer, utilize one of the welding-based deposition system, laser-based deposition system, and plasma powder cladding system to deposit any of the two-dimensional layers of material. The machining station includes a multi-axis milling machine and an automatic tool changer. The milling machine is operable to, when directed by the computer, select from a plurality of machining tools associated with the automatic tool changer for use in the milling machine.

Embodiments of the invention provide a number of technical advantages. Embodiments of the invention may include all, some, or none of these advantages. According to one embodiment of the invention, a system for manufacturing or repairing parts produces better accuracy than a purely additive solid freeform fabrication ("SFF") process due to the introduction of intermediate material removal procedures. In addition, the materials and deposition methods utilized are not constrained by the resolution of the deposition, since the accuracy of the parts is controlled by the shaping processes. Another technical advantage is that no custom fixturing is required. Fixtures are inherent in the additive/subtractive manufacturing method; support structures and all previously built layers automatically serve as fixtures for the subsequent layers. Employing an additive/subtractive manufacturing method also opens up the engineering design space. Parts may be embedded with prefabricated components, such as electronic devices or sensors. In addition, it is capable of constructing internal intricate features as well as integrated assembly mechanisms.

According to another embodiment of the invention, the operational welding parameters of welding-based deposition processes are controlled to facilitate homogeneous mechanical properties across the volume of a three-dimensional part. In addition, the microstructural of a part may be controlled to tailor the properties of the part to an optimized solution.

According to another embodiment of the invention, a closed-loop control system based on infrared image sensing for controlling the size of the molten pool in a laser-based additive manufacturing ("LBAM") process improves the geometrical accuracy of parts and simultaneously provides the desired microstructure.

According to another embodiment of the invention, a powder delivery system permits precise control of a metering device that is continuously fed or dosed from a hopper with an amount of a powder that is delivered to a molten pool formed on a functional component and/or sacrificial substrate component in a LBAM process or apparatus. Such a powder delivery system may be used to produce a functional part, including a functionally gradient part ("FGP"), having desired chemical and/or mechanical properties.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1A through 9 of the drawings, in which like numerals refer to like parts.

Figure 1A:
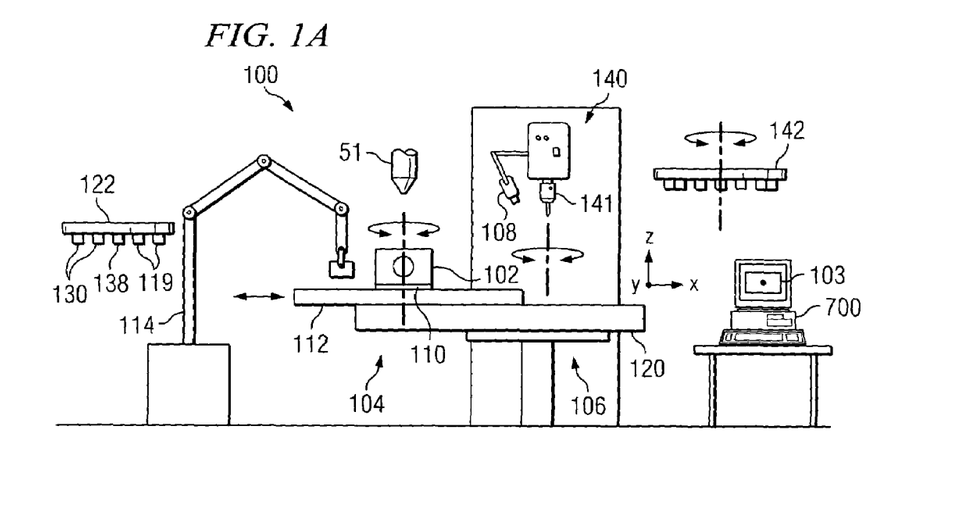
FIGS. 1A and 1B are elevation and plan views, respectively, of a system for manufacturing or repairing parts according to one embodiment of the invention.
Figure 1B:
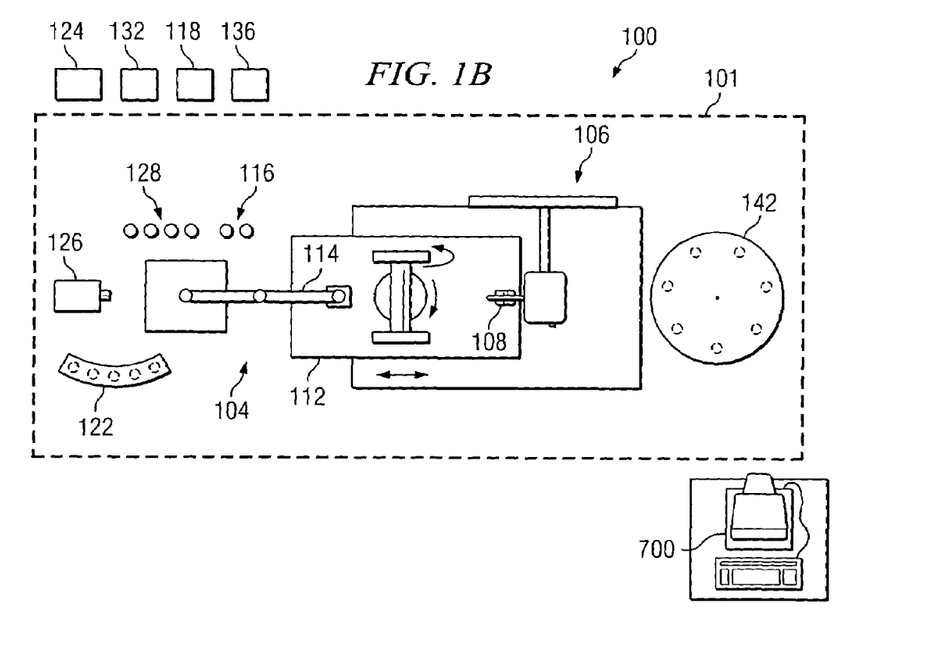

FIGS. 1A and 1B are elevation and plan views, respectively, of a system 100 for manufacturing or repairing parts according to one embodiment of the invention. As described below, this multi-fabrication system provides the capability to make complex parts having internal and external geometric features with high dimensional accuracy and superior surface quality. For example, the same setup for one computer controlled system platform, system 100 may perform the following operations: four additive operations and/or their combination, a plurality of subtractive operations, in-process and post-process inspection, and scanning for reverse engineering. The combination of additive and subtractive processes exhibits some technical advantages, such as the production of more accurate complex parts, as well as materials and deposition processes that are not constrained by the resolution of the deposition since the accuracy of the parts may be controlled by the shaping process. In addition, no custom fixturing is required; fixtures are inherent in additive/subtractive rapid manufacturing processes because support structures in all previously built layers automatically serve as fixtures for subsequent layers. Although system 100 may be suitable for many applications, system 100 may be particularly suitable for a "parts hospital." Such a parts hospital may contribute to the strengthening of America's military readiness. Accordingly, the components of system 100 may be contained within an enclosure 101 for ease of mobility, or the components of system 100 may be free-standing on a shop floor or other suitable location.

The illustrated embodiment, system 100 includes a computer 700 operable to control the fabrication or repair of a three-dimensional part 102 using digital data, such as any suitable solid computer aided design ("CAD") model 103. Solid CAD model 103 may be generated using any suitable CAD application, such as Catia, Pro Engineer, Solid Designer, SolidEdge, and Unigraphics, among others. To control the fabrication of part 102, computer 700 is coupled to a deposition station 104 and a machining station 106. Computer 700 may also be coupled to an inspection station, denoted in FIGS. 1A and 1B by an inspection device 108.

Deposition station 104 is operable to deposit successive two-dimensional layers of material to fabricate part 102. Accordingly, deposition station 104 includes a substrate 110 upon which part 102 is fabricated, a two rotary axis shifting platform 112 to support substrate 110, a plurality of deposition systems, and a multi-axis robot 114 that is operable to, when directed by computer 700, utilize one of the deposition systems to deposit any of the two-dimensional layers of material when fabricating part 102. Multi-axis robot 114 may be any suitable industrial robot having any suitable number of multiple axes. For example, in a particular embodiment of the invention, multi-axis robot 114 is a six-axis robot.

The deposition systems may include a welding-based deposition system, a laser-based deposition system, and a plasma powder cladding system. Any one of these deposition systems or combination of deposition systems may be utilized in depositing any of the two-dimensional layers of material. An advantage of having multiple deposition systems is that the advantages of each individual deposition system may be maximized to facilitate the fabrication of a complex part having high dimensional accuracy and superior surface quality in the least amount of time. For example, a welding-based deposition system is characterized by a metal deposition rate one order of magnitude faster than a laser-based deposition system, while a laser-based deposition system is characterized by the ability to build finer geometrical features with a smaller heat affected zone, less porosity, multiple material composition, better control the material properties, and the possibility to deposit metal powder in any direction. Each of these deposition processes is described in more detail below.

Substrate 110 may be any suitable substrate upon which part 102 is fabricated. In other embodiments of the invention, substrate 110 is not utilized and part 102 is directly fabricated upon two rotary shifting platform 112. Two rotary shifting platform 112, in one embodiment, not only is able to translate in the x, y, and z directions but is also able to rotate around vertical and horizontal axes. As described in more detail below, two rotary shifting platform 112 works in conjunction with a multiple axis worktable 120 of machining station 106 when material removal is required during the fabrication of part 102.

A welding based deposition system utilized in system 100 may be any suitable welding based deposition system, such as a gas metal arc welding ("GMAW") system, a gas tungsten arc welding ("GTAW") system, or other suitable welding based deposition system having consumable or non-consumable electrodes. Welding based deposition system includes one or more wire feeders 116, a welding power source 118, and one or more welding torches 119. Depending upon the welding process utilized, one or more inert gasses 121 may also be utilized. For a welding based deposition system to be utilized in system 100, computer 700 directs multi-axis robot 114 to obtain a particular welding torch 119 from automatic changer 122 and to choose a particular wire feeder 116 to utilize. Welding torch 122 would then be placed in proximity to substrate 110 in order to deposit a two-dimensional layer of material for part 102. Computer 700 may utilize any suitable computer aided manufacturing ("CAM") software or other suitable software for the control of robot 114.

A laser based deposition system utilized for system 100 may be any suitable laser based system, such as a Nd:YAG laser deposition system 124, a diode laser deposition system 126, or other suitable laser based additive manufacturing system. A laser based deposition system includes one or more powder feeders 128, and one or more laser heads 130. A laser chiller 132 may also be utilized depending upon the laser based deposition system utilized. When laser based deposition system is utilized to deposit a two-dimensional layer for part 102, as directed by computer 700, multi-axis robot 114 obtains a particular laser head 130 from automatic changer 122 and one or more powder feeders 128 is coupled to the particular laser head 130 so that the two-dimensional layer of material may be deposited. A particular laser based deposition system is described below in conjunction with FIGS. 2 through 6.

A plasma powder cladding system utilized in system 100 may be any suitable plasma powder cladding system having a plasma transferable arc power source 136. When solid CAD model 103 directs that a particular two-dimensional layered material needs to be deposited by plasma powder cladding, computer 700 directs multi-axis robot 114 to obtain a plasma torch 138 from automatic changer 122, and suitably couple one or more powder feeders 128 to plasma torch 138 in order for the two-dimensional layer to be deposited.

Depending upon the solid CAD model 103 for part 102, various geometrical features may need to be formed in part 102 by a material removal processes. Therefore, machining station 106 needs to be utilized.

Machining station 106 may be any suitable machining station that is operable to perform any suitable removal processes. In the illustrated embodiment, machining station 106 includes a multi-axis CNC milling machine 140. Any suitable number of axes may be associated with multi-axis CNC milling machine 140, such as a 3 axis, 4 axis, 5 axis, or other suitable axes. Multi-axis milling machine 140 may be operable to perform any suitable material removal operations, such as milling, drilling, boring, reaming, tapping, grinding, polishing, vertical turning, or other suitable material removal process.

In order to facilitate a particular removal process, an automatic tool changer 142 is associated with CNC milling machine 140. Automatic tool changer 142 houses all the appropriate tools for a particular material removal operation. Automatic tool changer 142 may be directly coupled to CNC milling machine 140 or may be separate from CNC milling machine 140. If a particular material removal operation needs to be performed on part 102, computer 700 directs CNC milling machine 140 to obtain the desired tool from automatic tool changer 142 in order that the process may be carried out. As discussed in more detail below, two-rotary shifting platform 112 translates underneath a machining head 141 of CNC milling machine 140 in order that the process be carried out. The two-rotary shifting platform 112 may be coupled to or associated with work table 120 of CNC milling machine 140 in any suitable manner.

In addition to performing intermittent material removal processes on part 102, inspection of part 102 either during the fabrication or after the fabrication of part 102 may be performed by system 100. As illustrated in FIGS. 1A and 1B, an inspection device 108 may be utilized for this intermediate or post-processing inspection. Inspection device 108 may be coupled to CNC milling machine 140 or may be located separately from CNC milling machine 140. Any suitable inspection device or devices may be utilized for inspecting part 102. These inspection devices are well known in the art of material fabrication. Inspection device 108 may also be controlled by computer 700 and may provide feedback to computer 700 in order that computer 700 can make adjustments during the fabrication of part 102. Examples of this are described below in conjunction with FIGS. 7 through 9.

In a particular embodiment of invention, inspection device 108 or other suitable scanning devices may be utilized to reverse engineer a part. This reverse engineering may be utilized to create a solid CAD model of the reverse engineered part so that a new part having the same geometrical configuration may be produced by system 100.

As described in more detail below, feedback to computer 700 is an important feature of the present invention. Suitable laser scanning devices and other suitable monitoring devices are utilized throughout system 100 in order that part 102 may be fabricated accurately. For example, the parameters of a deposition process may be changed on a substantially real-time basis, so that the dimensional accuracy, mechanical properties, or other characteristics of part 102 may be optimized. For example, during a laser based deposition process, the amount of powder delivered to the molten pool that is created during the process may be controlled. An embodiment of this is described below in conjunction with FIGS. 2 though 6. Another example is the controlling of the molten pool in a laser based additive manufacturing process.

An embodiment of this is described below in conjunction with FIGS. 6 through 8. A still further example is the control of the heat affected zone within part 102 during a welding based deposition process. An embodiment of this is described below in conjunction with FIGS. 7 and 8.

Figure 2:
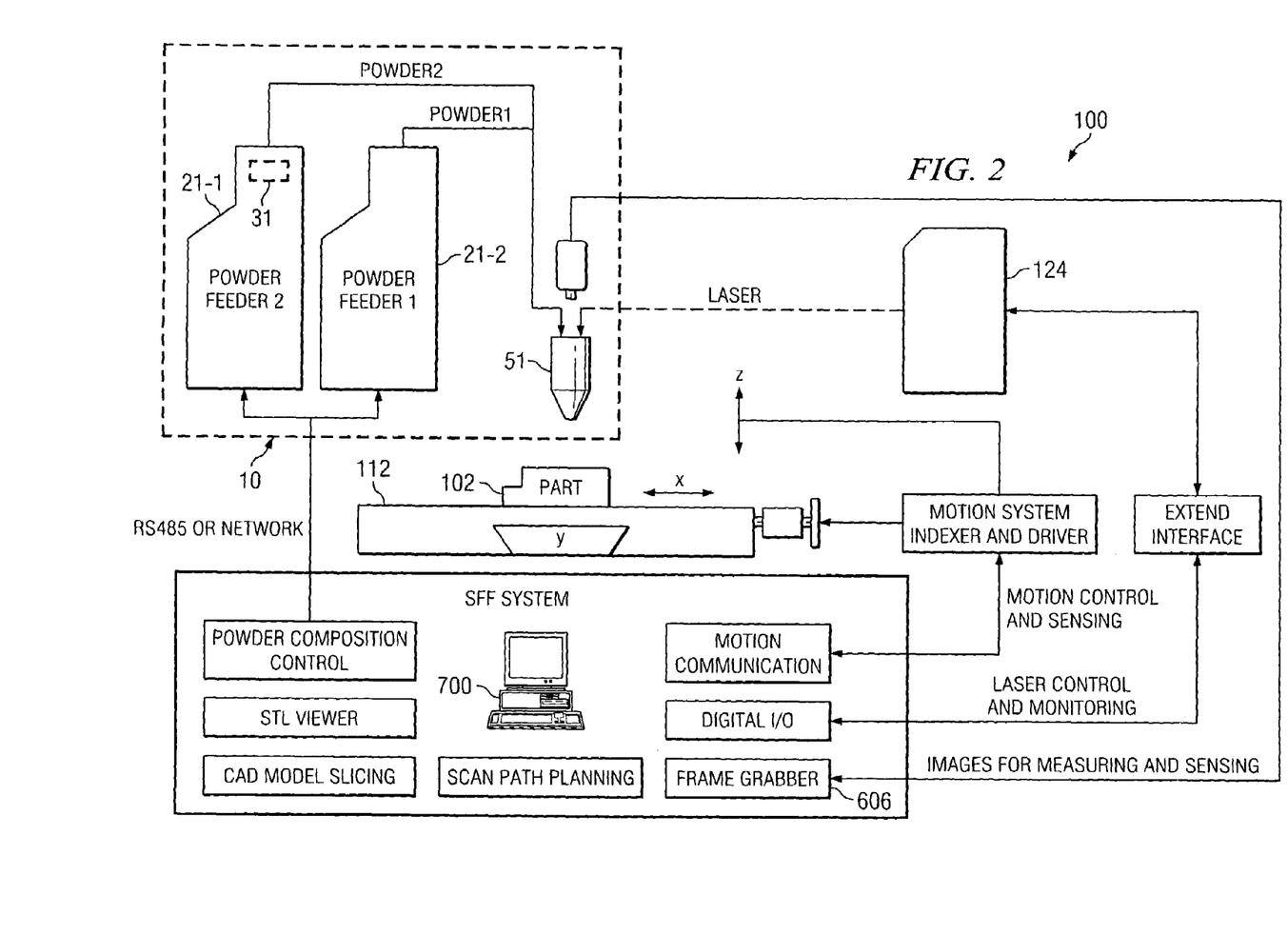
FIG. 2 is a block diagram of a laser based additive manufacturing ("LBAM") system that includes a powder delivery system according to one embodiment of the invention.

FIG. 2 illustrates an embodiment of system 100 in which system 100 is an LBAM system that includes a powder delivery system 10 according to one embodiment of the invention. The illustrated LBAM system is utilized in the fabrication of part 102. In a particular embodiment, part 102 is in the form of a "functionally gradient part" ("FGP") having varied chemical and/or mechanical properties at differing portions of part 102.

Powder delivery system 10, in the illustrated embodiment, includes one or more hoppers 21 having corresponding hopper outputs to contain and continuously feed the powder to a downstream portion of powder delivery system 10. Any suitable number of hoppers 21 may be used in powder delivery system 10 and each may include the same or a different powder than each of the other hoppers 21. In the illustrated embodiment, two hoppers 21-1, 21-2, each include a different powder. Any suitable powder may be utilized, such as a metal powder, a ceramic powder, and a carbide powder. Hoppers 21 may be of any suitable type, such as a gravity fed hopper, so long as the powder may be satisfactorily contained and continuously fed to the downstream portion of powder delivery system 10. In one embodiment, the downstream portion includes a metering device 31 associated with one or more of the hoppers 21, as described in further detail below in conjunction with FIG. 3.

Figure 3:
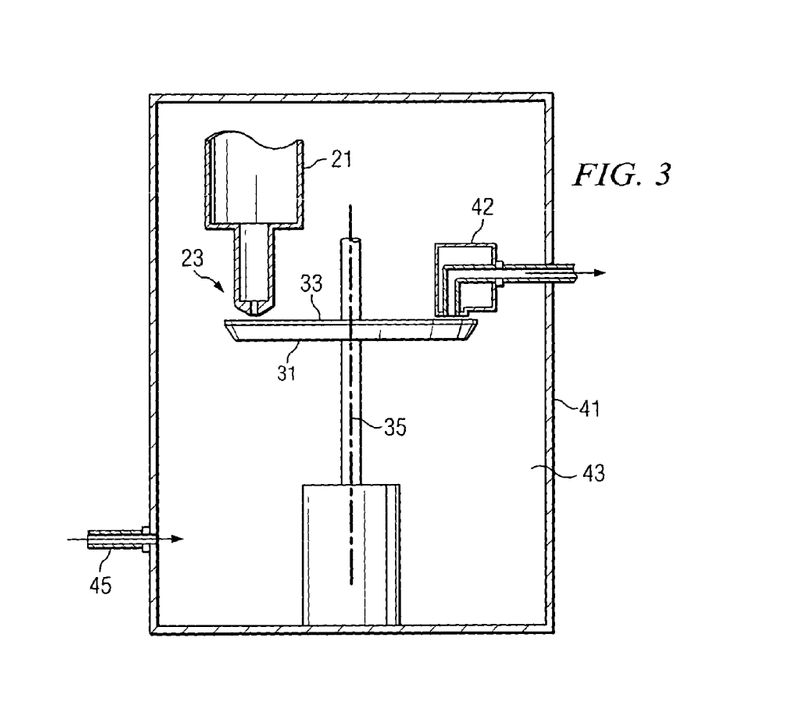
FIG. 3 shows an elevation view of a portion of the powder delivery system of FIG. 2 according to one embodiment of the invention.

FIG. 3 is an elevation view of a portion of powder delivery system 10 illustrating metering device 31 according to one embodiment of the invention. Although a specific embodiment of metering device 31 is illustrated FIG. 3, metering device 31 may be of any suitable type, so long as metering device 31 can function to receive powder continuously fed or dosed from hopper 21 and deliver the powder to a downstream portion of powder delivery system 10. In the illustrated embodiment, powder is continuously fed or dosed from hopper 21 to a substantially flat surface 33 of metering device 31. This may be achieved by disposing metering device 31 proximate an output 23 of hopper 21 by a prescribed gap. Metering device 31 is rotated about an axis of rotation 35 at a predetermined rate of rotation. By this arrangement, a quantity of powder delivered from output 23 of hopper 21 at a continuous feeding rate may be "sheared off" from a quantity of the powder remaining in hopper 21 by flat surface 33.

Because the powder is deposited on flat surface 33, the feeding or dosing of the powder to metering device 31 is continuous for a given rate of rotation of metering device 31. This is in contrast to a metering device that is non-continuously fed or dosed with the powder, which typically includes discrete areas having varying amounts of powder disposed thereon for a given flow rate. The geometry of output 23 of hopper 21, the rate of rotation of metering device 31, the prescribed gap between output 23 and flat surface 33, and the properties of the powder, among other factors, determine a mass and/or a volumetric feeding rate of the powder delivered to metering device 31. Although any suitable mass and/or a volumetric feeding rate may be utilized, it has been determined through experimentation that metering device 31 may be continuously fed at a relatively small feeding rate (e.g., from a minimum of about 1.0 grams/minute to a maximum of about 15.0 grams/minute) and a relatively continuous feeding rate (e.g., with a variance about 1.0 grams/minute or less). In addition, the continuous feeding rate may be changed over a relatively short time interval (e.g., less than about 3 seconds, and more preferably, to less than about 1 second). Such precise control over the feeding rate of each of a plurality of individual powders may be used to fabricate a functionally gradient part ("FGP"), such as part 102.

Figure 4:
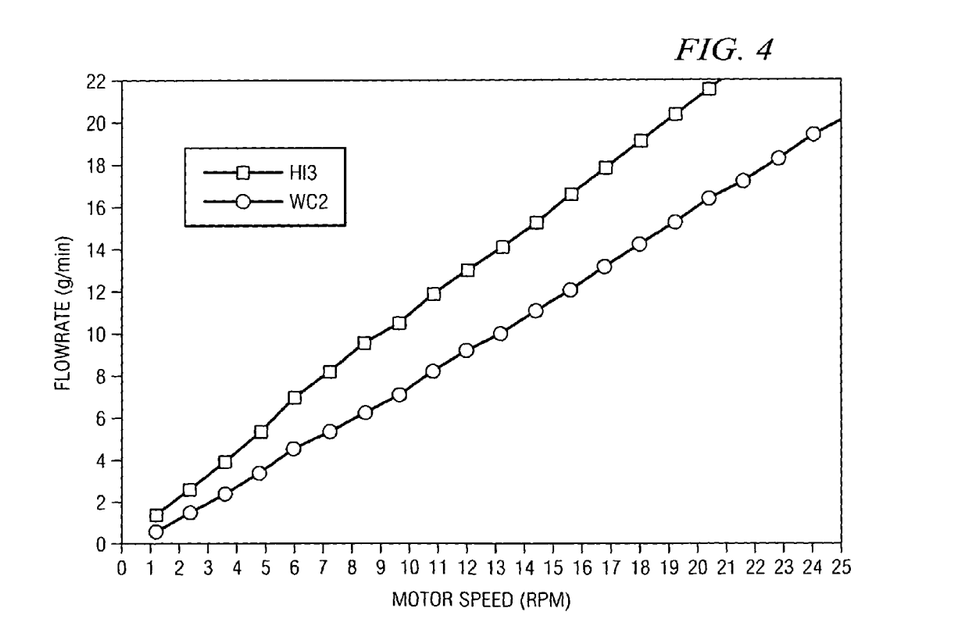
FIG. 4 is a graphical representation of powder feeding rates as a function of rates of rotation of a metering device according to one embodiment of the invention.

FIG. 4 is a graphical representation 39 of powder feeding rates as a function of rates of rotation of metering device 31. As shown in FIG. 4, it has been determined through experimentation that for a given set of factors, the feeding or dosing rate of powder to metering device 31 varies almost linearly with the rate of rotation of metering device 31. Further, for a given set of factors, coarse adjustments of the feeding or dosing rate to metering device 31 may be achieved by varying the size of the prescribed gap between output 23 of hopper 21 and the metering device 31, either manually or automatically (e.g., by computer control), and/or that fine adjustments of the feeding or dosing rate may be achieved by varying the rate of rotation of metering device 31.

Figure 5:
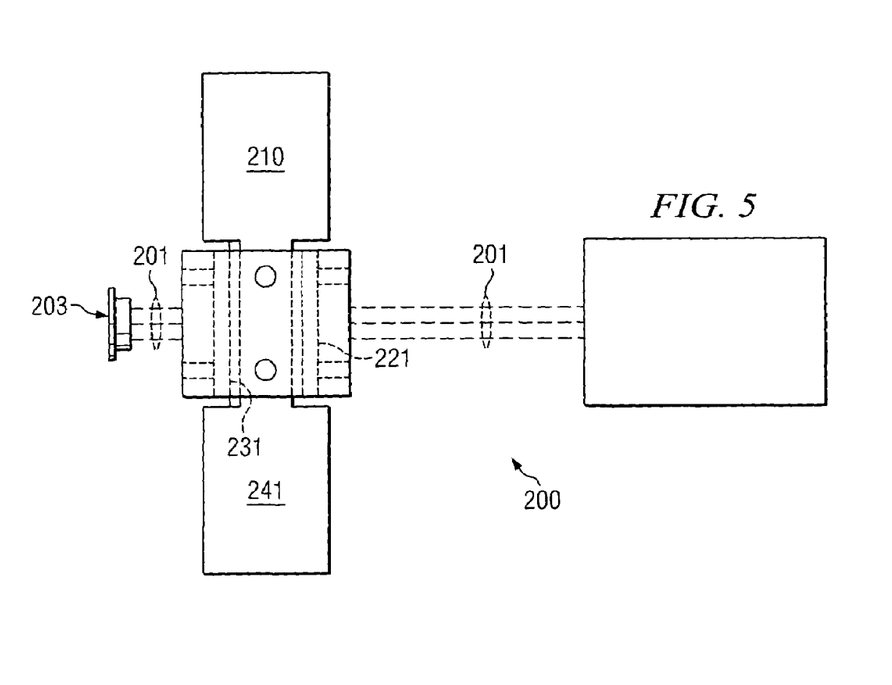
FIG. 5 shows a plan view of a flow determining device including an optical electronic system according to one embodiment of the invention.

Powder delivery system 10 may include one or more mass and/or volume flow determining devices to determine the feeding rate of powder delivered from hopper 21. In one embodiment of the invention, an optical electronic system 200 may be used to determine a volumetric feeding rate of the powder, as illustrated in FIG. 5. In addition, a scale (not shown) may be used to directly measure a mass feeding rate.

Referring to FIG. 5, optical electronic system 200 includes a collimated and/or expanded laser beam 201 and a light detecting or optical sensor 203. The laser beam 201 is disposed on a first side of the powder delivered from a powder delivery nozzle 51 (FIGS. 2 and 6), and optical sensor 203 is disposed on a second side thereof. As a density of the powder flowing from powder delivery system 10 to the component part 102 changes, an amount of laser light scattered by the powder increases or decreases accordingly. As such, an amount of laser light received by optical sensor 203 also decreases or increases. Accordingly, optical sensor 203 can output a voltage in proportion to the amount of incident light received by optical sensor 203. Through any suitable calibration process, the volumetric feeding rate of the powder may be determined from the voltage output of optical sensor 203.

The optical electronic system 200 may further include an electronic device (not shown) for determining the mass feeding rate of the powder based on both (i) the volumetric feeding rate of the powder and (ii) known or predetermined properties of the powder. For example, any suitable computer (not shown) may be controlled as a proportional, integral, derivative ("PID") controller and/or as a fuzzy logic controller to determine the mass feeding rate. Parameters of powder delivery system 10 may be adjusted (e.g., the rate of rotation of metering device 31, the prescribed gap between flat surface 33 and output 23 of hopper 21, etc.) based on a difference between the measured feeding rate and the desired feeding rate to achieve the desired feeding rate.

Optical electronic system 200 may be housed within a closed structure to minimize an influence of external factors acting on the powder at the point of volumetric flow determination. For example, the optical electronic system 200 may include a cell 210 defining a volume through which the powder flows. The cell 210 may include a first window 221 for receiving the laser light into the interior of the volume and a second window 231 for transmitting the light to optical sensor 203. One or both of the windows 221, 231, may be coated with a transparent conductive layer that prevents a static charge buildup on the glass windows, thereby preventing the powder from adhering thereto. In one embodiment, the coating is Indium Tin Oxide. The cell may also include a metal block 241 to ground one or both of the windows 221, 231 thereto. One or more seals (not shown) may be disposed around at least part or all of one or both of windows 221, 231 to further isolate the volume of cell 210 from external factors. One or more, and preferably two, air ionizers (not shown) may be placed in contact with and/or apart from cell 210 to direct a combination of positively and negatively charged ions at cell 210, thereby removing the static charge from the windows 221, 231.

As discussed above, the feeding rate determining device may also include a scale that can directly measure the mass feeding rate of the powder. The scale may be insensitive to noise and/or to vibration. In one embodiment, a strain gauge may be used to measure a strain and, consequently, the change in mass of the powder in the hopper 21.

Referring back to FIG. 3, in one embodiment, metering device 31 is a disk, and more preferably, a flat disk having an approximately circular cross section. Further, the disk may be rotated by any suitable device, such as a direct current ("DC") stepper motor. The use of a DC stepper motor permits a precise adjustment of the rate of rotation of metering device 31. A powder removal device 41 may remove the powder from flat surface 33. The present invention may include any suitable powder removal device 41, so long as powder removal device 41 can remove the powder from metering device 31 and deliver the powder to a further downstream portion of powder delivery system 10. In a preferred embodiment, each of metering devices 31, and consequently, each of the hoppers 21, may include a separate powder removal device 41.

In one embodiment of powder removal device 41, a vacuum device 42 is disposed in a chamber 43 that includes a carrier gas input orifice 45. A carrier gas may be introduced into chamber 43 through input orifice 45 and may be removed from chamber 43 through any suitable opening in vacuum device 42. By this arrangement, the inflow and outflow of the carrier gas can create a vacuum capable of removing the powder from flat surface 33 of metering device 31. The carrier gas may be any suitable gas so long as the performance of powder delivery system 10 is not unsatisfactorily degraded. In one embodiment, carrier gas is an inert gas, such as argon.

In an alternate embodiment of the invention, powder removal device 41 includes a scraper or scraping device (not shown) in lieu of vacuum device 42 to remove powder from metering device 31. The scraper device may include a blade that contacts flat surface 33 of metering device 31 to scrape or push the powder therefrom. However, such a powder removal device may suffer from a disadvantage in that the scraper and/or metering device 31 may become worn from extended use and contact therebetween. Wear of one or both of these components may result in the formation of an undesirable gap between the powder removal device and metering device 31, which may prevent the powder delivered to metering device 31 from being satisfactorily removed therefrom and degrade the accuracy of powder delivery system 10. In another alternate embodiment of the invention, powder removal device 41 includes a suitable air-blower or air-blowing device (not shown) to move a volume of air to push the powder from metering device 31.

Powder removal device 41 may deliver a plurality of differing powders from a plurality of hoppers 21 to a mixing unit or manifold (not shown) and subsequently to a powder nozzle 51 (FIGS. 2 and 6), or alternatively may deliver a single powder from a single hopper 21 to powder nozzle 51. Thus, during the manufacture of a FGP, for example, the mixing manifold may ensure that the differing powders are thoroughly mixed before the powders are delivered to the further downstream portion of powder delivery system 10.

Figure 6:
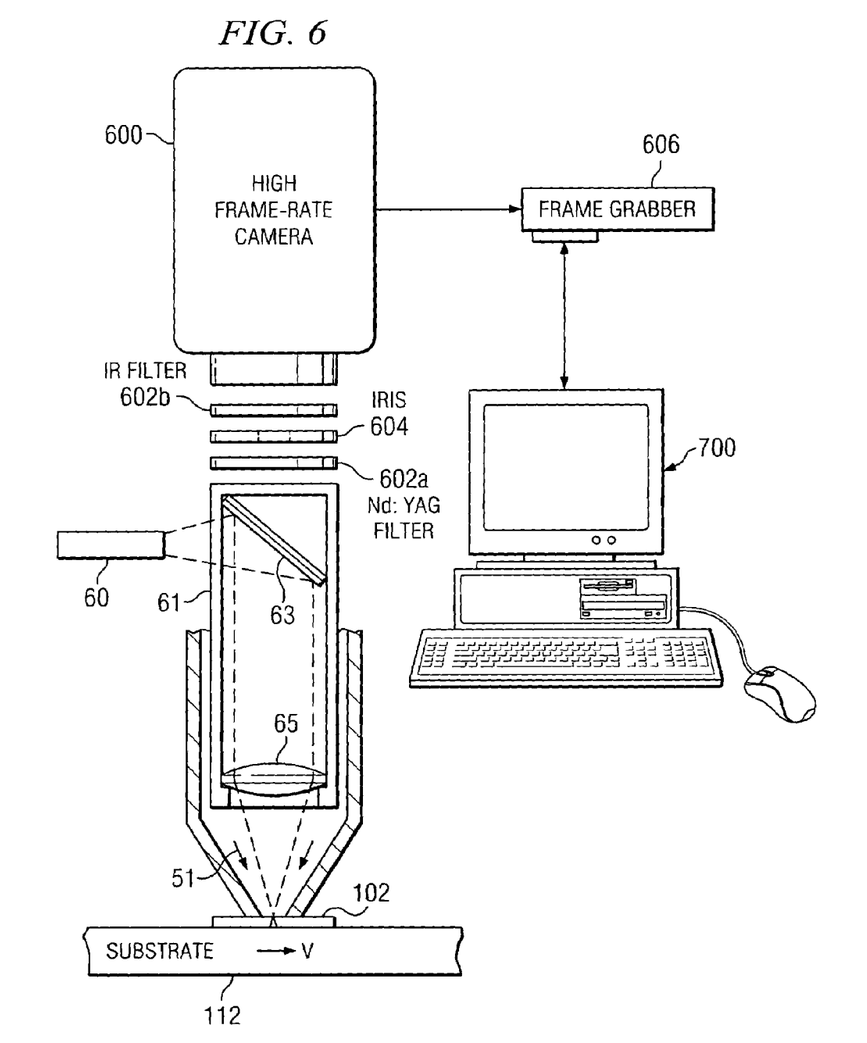
FIG. 6 is a cross sectional elevation view of a powder nozzle according to one embodiment of the invention.

Referring to FIG. 6, powder nozzle 51 may receive powder delivered by powder removal device 41 and deliver the powder to part 102 being fabricated by system 100. Powder nozzle 51 surrounds a laser beam 60 that is used to form a molten pool on part 102. As discussed above, a carrier gas may be used to deliver the powder around laser beam 60 and through powder nozzle 51 to part 102. In a preferred embodiment, an argon gas that is used to remove the powder from metering device 31 may also be used to deliver the powder to component part 102 through powder nozzle 51.

Laser beam 60 may be generated from any suitable laser system. A laser head 61 including a partially reflective mirror 63 and a focusing lens 65 directs laser light from laser beam 60 onto part 102, such that a molten pool is formed on part 102. The delivered powder then contacts the molten pool and melts, thereby adding material to part 102. In one embodiment, laser beam 60 is generated by a one thousand watt (1000 W) Nd:YAG laser; however, laser beam 60 may be of any suitable type.

Also illustrated in FIG. 6 is an infrared sensing device 600 that is operable to sense a molten pool during material deposition by a laser based deposition system. Infrared sensing device 600 senses infrared radiation during the LBAM process after passing through suitable filters 602 sandwiching an iris 604. Infrared sensing device 600 is coupled to a frame grabber 606, which in turn is coupled to computer 700. Details of computer 700 are described below in conjunction with FIG. 7.

Infrared sensing device 600 may be any suitable infrared sensing device, such as a high-frame rate digital charge coupled device ("CCD") camera. Obtained infrared images during the LBAM process may be calibrated using an ultra-high shutter speed camera assisted with a pulsing nitrogen laser. The shape of the molten pool during the LBAM process may be captured in substantially real-time and fed to computer 700 so that computer 700 may determine whether or not adjustments should be made of the parameters of the LBAM process during the deposition. For example, with respect to the LBAM process described in FIGS. 2 through 6, the prescribed gap between output 23 of hopper 21 and top surface 33 of metering device 31 may be adjusted, the rotational speed of metering device 31 may be adjusted, or other suitable adjustments may be carried out. Various adjustments may also be made to the laser based additive manufacturing system to control the molten pool during the deposition of the material. This is described in greater detail below in conjunction with FIGS. 7 and 8. A computer 700, which stores solid CAD model 103, may also control the heat affected zone within part 102 based on the geometrical features of solid CAD model 103. The details of one embodiment of this is described below in conjunction with FIGS. 7 and 9.

Figure 7:
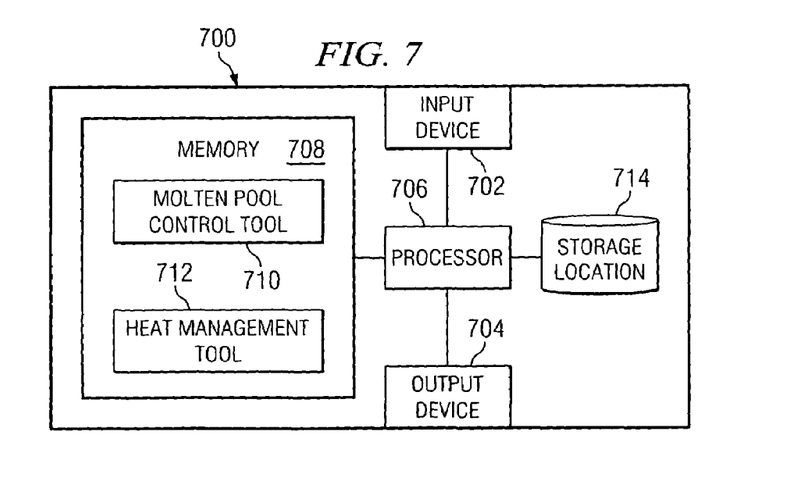
FIG. 7 is a block diagram of a computer for use in the system of FIGS. 1A and 1B according to an embodiment of the invention.

FIG. 7 is a block diagram of computer 700 for use in system 100 according to one embodiment of the invention. In the illustrated embodiment, computer 700 includes an input device 702, an output device 704, a processor 706, a memory 708 storing molten pool control tool 710 and heat management tool 712, and a storage location 714.

Input device 702 is coupled to computer 700 for allowing the user of system 100 to fabricate part 102. For example, although not illustrated in FIG. 7, a suitable CAD application, as described above, may be utilized by the user to create solid CAD model 103 for part 102. In addition, a suitable CAM application may be utilized to control the components of system 100 during the manufacturing of part 102. In one embodiment, input device 702 is a keyboard, however input device 702 may take other forms, such as a mouse, a stylus, a scanner, or any combination thereof. Output device 704 is any suitable visual display unit, such as an LCD or CRT display, that allows a user to see solid CAD model 103 as it is being created or part 102 as it is being fabricated. Output device 704 may also be coupled to a printer for the purpose of printing out any desired information, such as detailed drawings, or other suitable information.

Figure 8A:
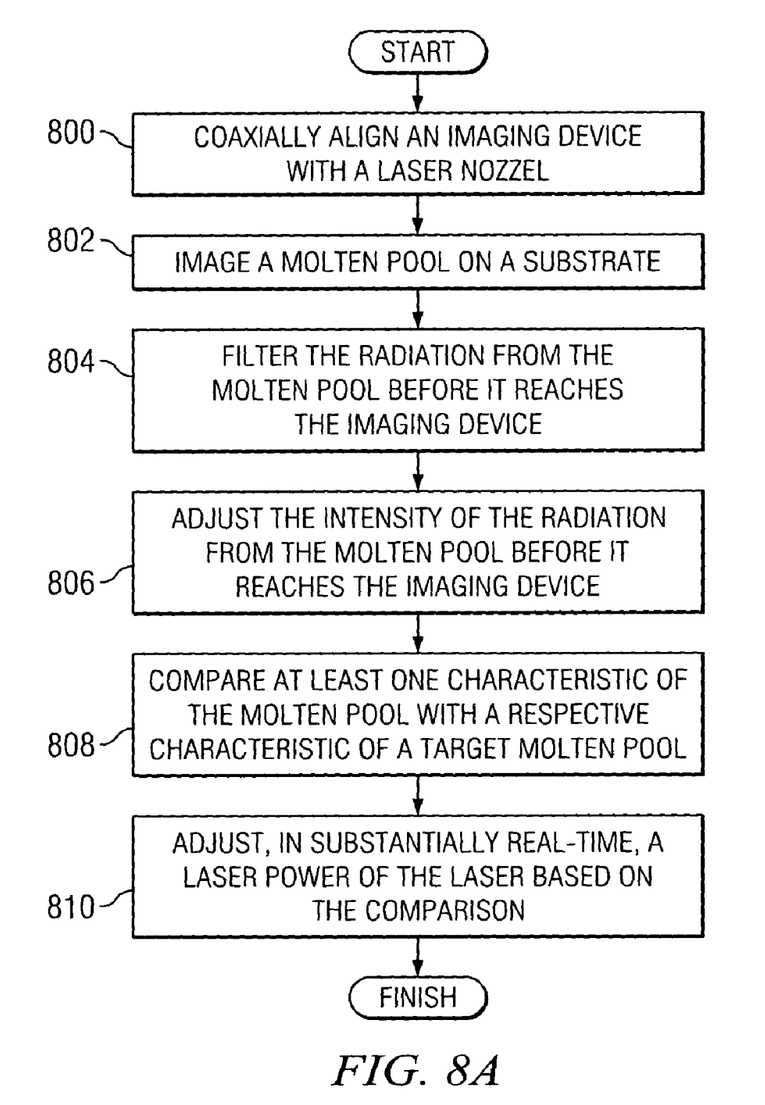
FIG. 8A is a flowchart illustrating an example method of controlling the size of the molten pool in laser-based additive manufacturing according to an embodiment of the invention.

Processor 706 comprises any suitable type of processing unit that executes logic. One of the functions of processor 706 is to retrieve molten pool control tool 710 or heat management tool 712 from memory 708 and execute those tools to control the fabrication of part 102. These functions of tools 710 and 712 are discussed more fully below in conjunction with FIGS. 8 and 9. Processor 706 may also control the retrieving and/or storing of information and other suitable data, such as any computer aided design or computer aided manufacturing data.

Molten pool control tool 710 is a computer program written in any suitable computer language. According to the teachings of one embodiment of the present invention, molten pool control tool 710 is operable to receive feedback from sensors and/or monitoring devices associated with system 100 and, based on that feedback, adjust any necessary parameters of the deposition process currently being employed for the deposition of a two-dimensional layer of part 102. Some of the functions of molten pool control tool 710 are described below in conjunction with FIG. 8.

Heat management tool 712 is a computer program written in any suitable computer language. According to the teachings of another embodiment of the present invention, heat management tool 712 is operable to adjust the parameters of a deposition process currently being employed for depositing a two-dimensional layer for part 102 based on the geometry of part 102 as denoted by solid CAD model 103. Some of the functions of heat management tool 712 are described below in conjunction with FIG. 9.

Memory 708 and storage location 714 may comprise files, stacks, databases, or other suitable organizations of volatile or non-volatile memory. Memory 708 and storage location 714 may be random access memory, read only memory, CD-ROM, removable memory devices, or any other suitable devices that allow storage and/or retrieval of data. Memory 708 and storage location 714 are interchangeable and may perform the same functions.

FIG. 8A is a flowchart illustrating an example method of controlling the size of the molten pool in laser-based additive manufacturing according to an embodiment of the invention. The example method illustrated in FIG. 8A illustrates some of the functionality of molten pool control tool 710 (FIG. 7) and should be read with reference to FIG. 6.

The example method begins at step 800 where an imaging device, such as camera 600, is coaxially aligned with a laser nozzle, such as nozzle 51. Imaging device is utilized to image a molten pool on a substrate, as denoted by step 802. To protect camera 600 from laser damage and/or overexposure, the radiation from the molten pool is filtered, at step 804, before it reaches imaging device 600. This filtering may be facilitated by laser filter 602a and infrared filter 602b. Laser filter 602a, in one embodiment, is a type of optical filter and is utilized to protect the camera from laser damage. Infrared filter 602b may be utilized to eliminate the image noise created by the metal powder being delivered through nozzle 51. In one embodiment, the radiation wavelength received by camera 600 is between 0.7 and 1.06 micrometers.

The intensity of the radiation from the molten pool may also be adjusted, as denoted by step 806, before it reaches the imaging device. This may be facilitated by iris 604, which is utilized to adjust the intensity to prevent overexposure received by camera 600. As described above, imaging device may be any suitable imaging device, such as camera 600, and in some embodiments may be a high frame rate charge coupled device ("CCD") camera that is operable to image the molten pool at a rate of up to approximately eight hundred frames per second. In addition, imaging may be at a resolution of approximately 128×128 or other suitable resolutions.

At least one characteristic of the molten pool from the image is compared with a respective characteristic of a target molten pool, at step 808. Based on this comparison, the laser power of laser 60 may be adjusted in substantially real-time, as denoted by step 810. This adjustment in laser power may achieve a constant and controllable size of the molten pool in order to control the geometrical accuracy and material microstructure of the part being produced, such as part 102. The results of performing one embodiment of the example method as described above is shown below in conjunction with FIG. 8B.

Figure 8B:
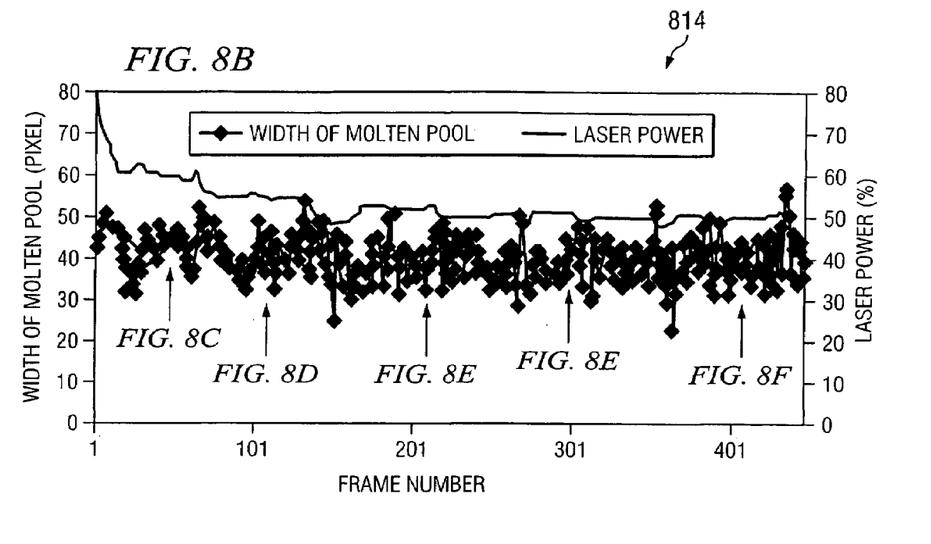
FIG. 8B illustrates an example graph and FIGS. 8C-8G illustrate example images from the graph of FIG. 8B showing successful control of a molten pool in laser-based additive manufacturing according to an embodiment of the invention.
Figure 8C:
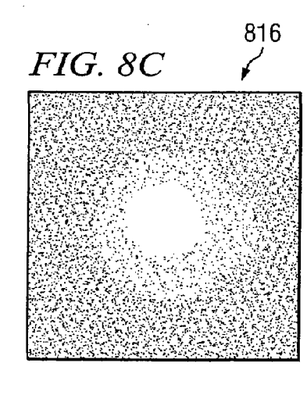
Figure 8D:
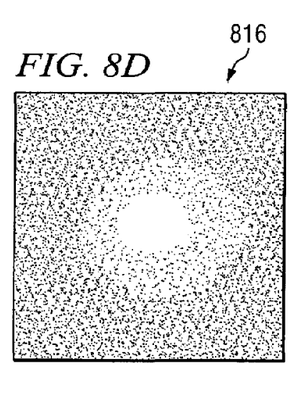
Figure 8E:
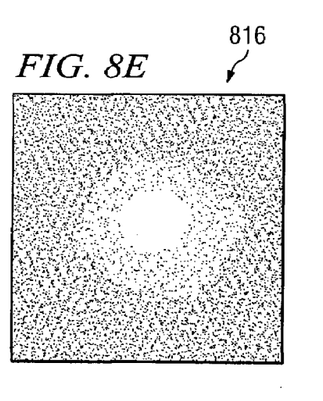
Figure 8F:
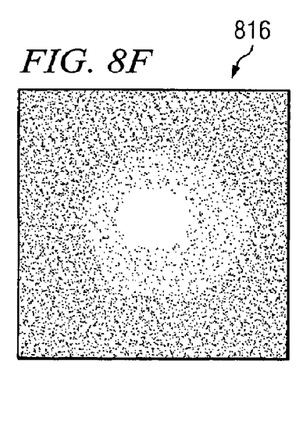
Figure 8G:
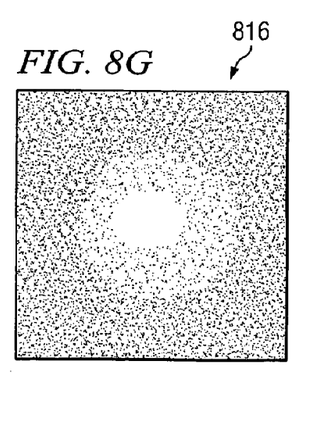

Referring to FIG. 8B, an example graph 814 is illustrated along with example images 816 showing successful control of the molten pool in laser-based additive manufacturing according to an embodiment of the invention. As illustrated in graph 814, the laser power to the laser is well correlated with the width of the molten pool, which in the illustrated embodiment is measured in pixels. This results in a relatively consistent and well controlled molten pool, as illustrated in the example images 816.

Figure 9:
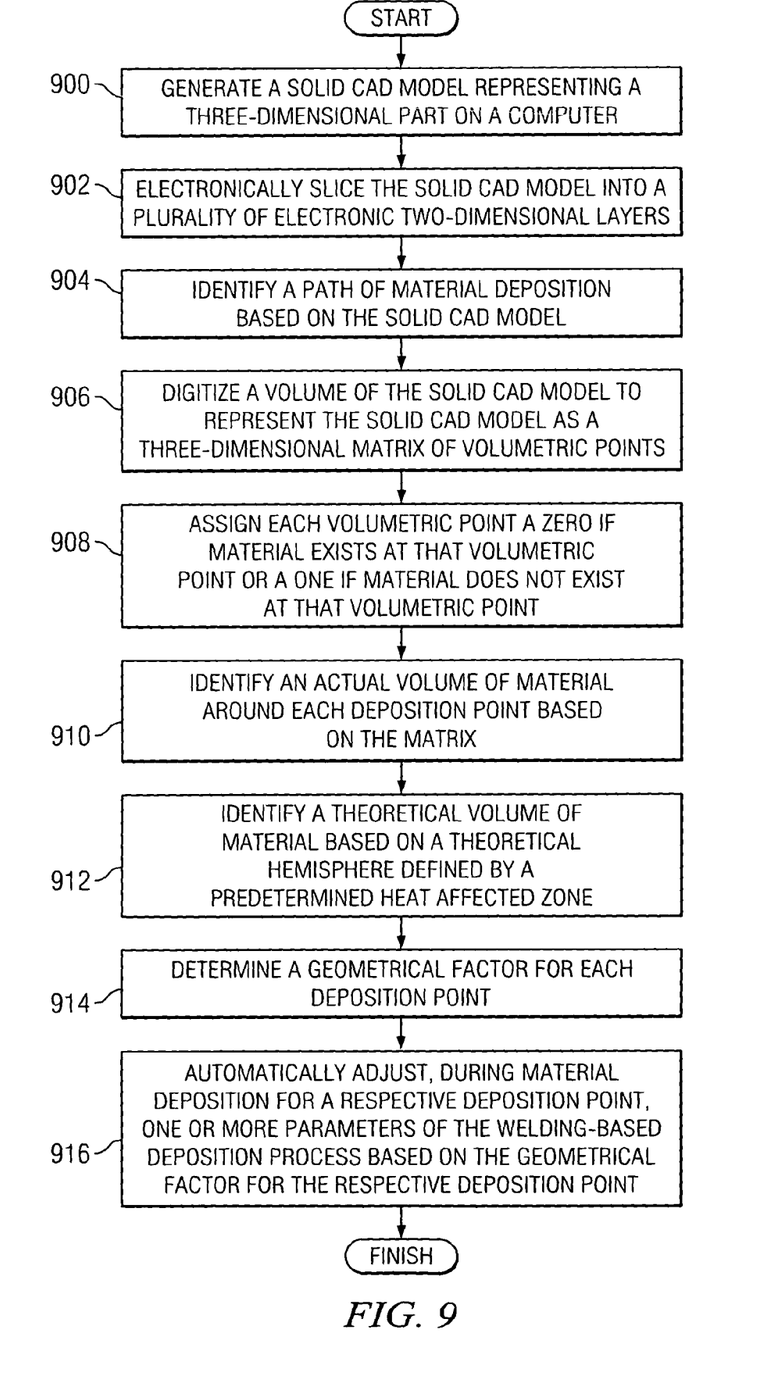
FIG. 9 is a flowchart illustrating an example method of controlling the operational weld parameters in welding-based deposition processes according to one embodiment of the invention.

FIG. 9 is a flowchart illustrating an example method of controlling the operational weld parameters in welding based deposition processes according to one embodiment of the invention. The example method outlined in FIG. 9 describes some of the functionality of heat management tool 712. The example method begins at step 900 where a solid CAD model, such as solid CAD model 103, representing a three-dimensional part, such as part 102, is generated on a computer, such as computer 700. Solid CAD model 103 is electronically sliced into a plurality of electronic two-dimensional layers, as denoted by step 902. Based on solid CAD model 103, a path of material deposition is identified at step 904.

A volume of solid CAD model 103 is then digitized to represent solid CAD model 103 as a three-dimensional matrix of volumetric points, as denoted by step 906. Each volumetric point is assigned either a zero if material exists at that volumetric point or a one if material does not exist at that volumetric point, as denoted by step 908. In this manner, an actual volume of material around each deposition point may be identified, at step 910, based on the three-dimensional matrix. A theoretical volume of material is also identified for each deposition point based on a theoretical hemisphere defined by a predetermined heat effected zone, as denoted by step 912. This theoretical hemisphere is based on an initial set of parameters for the particular welding based deposition process being employed.

A geometrical factor for each deposition point may then be determined at step 914. This geometrical factor, sometimes referred to as a "G" factor, is defined by a ratio of the actual volume of material around each deposition point identified at step 910 to the theoretical volume of material around each deposition point as identified in step 912. Accordingly, one or more parameters of the welding based deposition process being employed may be automatically adjusted during material deposition for a respective deposition point, as denoted by step 916. This automatic adjustment of the welding parameters is based on the geometrical factor for the respective deposition point. Examples of welding parameters that may be automatically adjusted include current, laser power, and plasma power.

Thus, homogeneous mechanical properties across the volume of the three-dimensional part, such as part 102, may be accomplished. This is due to the uniform cooling achieved because of the automatic adjustment of the welding parameters based on the above example method.

Although embodiments of the invention and their advantages are described in detail, a person skilled in the art could make various alterations, additions, and omissions without departing from the spirit and scope of the present invention as defined by the appended claims.

What is claimed is:

1. A system for fabricating a part, comprising:
   a computer operable to control the fabrication of a three-dimensional part using digital engineering data;
   a deposition station operable to deposit successive two-dimensional layers of material to fabricate the three-dimensional part, the deposition station comprising:
      a substrate on which to fabricate the three-dimensional part;
      a welding-based deposition system comprising a welding torch;
      a laser-based deposition system comprising:
         a laser head; and
         a powder delivery system comprising a hopper adapted to contain a powder and continuously feed the powder through an output of the hopper, a metering device adjacent the output of the hopper adapted to receive the powder continuously fed through the output of the hopper, and a vacuum powder removal device operable to remove the powder from the top surface via a vacuum;
      a plasma powder cladding system comprising a plasma torch; and
      a multi-axis robot operable to, when directed by the computer, utilize one of the welding-based deposition system, laser-based deposition system, and plasma powder cladding system to deposit any of the two-dimensional layers of material; and
   a machining station operable to remove at least a portion of one or more of the deposited two-dimensional layers of material, the machining station comprising:
      a multi-axis milling machine; and
      an automatic tool changer associated with the milling machine, the milling machine operable to, when directed by the computer, select from a plurality of machining tools associated with the automatic tool changer for use in the milling machine.

2. The system of claim 1, further comprising an inspection station operable to inspect the three-dimensional part for dimensional accuracy at any time during the fabrication of the three-dimensional part.

3. The system of claim 1, wherein the inspection station is operable to scan a completed part and wherein the computer is operable to generate and store a solid CAD model of the completed part for subsequent use in fabricating a new part of the same geometrical configuration.

4. The system of claim 1, wherein the welding-based deposition system further comprises a wire feeder and wherein the welding-based deposition system is selected from the group consisting of a gas metal arc welding system and a gas tungsten arc welding system.

5. The system of claim 1, wherein the laser-based deposition system comprises a Nd:YAG laser deposition system.

6. The system of claim 1, wherein the laser-based deposition system comprises a diode laser deposition system.

7. The system of claim 1, wherein the substrate comprises a two rotary axis shifting platform.

8. The system of claim 1, wherein the multi-axis milling machine comprises a four axis CNC milling machine having a three axis work table.

9. The system of claim 1, wherein the multi-axis milling machine is operable to perform a machining process selected from the group consisting of milling, drilling, boring, reaming, tapping, grinding, polishing, and vertical turning.

10. The system of claim 1, wherein the computer comprises a CAD/CAM application operable to store a solid CAD model and control the deposition station and the machining station based on the solid CAD model to fabricate the three-dimensional part.

11. The system of claim 10, wherein the computer is operable to control the heat input into any of the two-dimensional layers based upon the geometry of a predetermined CAD Data file from the solid CAD model.

12. The system of claim 1, wherein the computer is operable to vary an amount of the powder continuously fed to the metering device in response to monitoring material deposition by the laser-based deposition system.

13. The system of claim 1, wherein the laser-based deposition system further comprises an infrared sensing device operable to sense a molten pool during material deposition by the laser-based deposition system, the infrared sensing device operable to provide feedback to the computer for substantially real-time control of the molten pool.

14. A method for fabricating a part, comprising:
   generating a solid model representing a three-dimensional part on a computer;
   generating a plurality of electronic two-dimensional layers based on the solid model;
   selecting a deposition system to use for depositing respective two-dimensional layers of material corresponding to each of the electronic two-dimensional layers, the deposition system selected from the group consisting of a welding-based deposition system, a laser-based deposition system, and a plasma powder cladding system, the laser-based deposition system comprising an infrared sensing device operable to sense a molten pool during material deposition by the laser-based deposition system and operable to provide feedback to the computer for substantially real-time control of the molten pool;
   directing a multi-axis robot to obtain a desired deposition device corresponding to the selected deposition system;
   successively depositing, via the selected deposition system, the respective two-dimensional layers of material on a substrate; and
   intermittently removing, via a multi-axis milling machine controlled by the computer, material from the three-dimensional part based on the solid model during fabrication.

15. The method of claim 14, further comprising intermittently inspecting the three-dimensional part for dimensional accuracy during the fabrication of the three-dimensional part.

16. The method of claim 14, wherein electronically generating the plurality of electronic two-dimensional layers comprises creating a plurality of CAD data files.

17. The method of claim 14, wherein the welding-based deposition system is selected from the group consisting of a gas metal arc welding system and a gas tungsten arc welding system.

18. The method of claim 14, wherein the laser-based deposition system comprises a Nd:YAG laser deposition system.

19. The method of claim 14, wherein the laser-based deposition system comprises a diode laser deposition system.

20. The method of claim 14, further comprising controlling, by the computer, a two rotary axis shifting platform during fabrication of the three-dimensional part.

21. The method of claim 14, wherein the multi-axis milling machine comprises a four axis CNC milling machine having a three axis work table.

22. The method of claim 14, wherein intermittently removing material comprises intermittently performing a machining process selected from the group consisting of milling, drilling, boring, reaming, tapping, grinding, polishing, and vertical turning during fabrication of the three-dimensional part.

23. The method of claim 14, further comprising controlling, by the computer, the heat input into any of the two-dimensional layers based upon the geometry of a corresponding electronic two-dimensional layer.

24. The method of claim 14, wherein the deposition device is selected from the group consisting of a weld torch, a plasma torch, and a laser head.

25. A system for fabricating a part, comprising:
a computer operable to control the fabrication of a three-dimensional part using digital engineering data;
a deposition station operable to deposit successive two-dimensional layers of material to fabricate the three-dimensional part, the deposition station comprising:
a substrate on which to fabricate the three-dimensional part;
a welding-based deposition system comprising a welding torch;
a laser-based deposition system comprising:
a laser head; and
a powder delivery system comprising a hopper adapted to contain a powder and continuously feed the powder through an output of the hopper, a metering device adjacent the output of the hopper adapted to receive the powder continuously fed through the output of the hopper, a vacuum powder removal device operable to remove the powder from the top surface via a vacuum, and wherein the computer is operable to vary an amount of the powder continuously fed to the metering device in response to monitoring material deposition by the laser-based deposition system;
a plasma powder cladding system comprising a plasma torch; and
a multi-axis robot operable to, when directed by the computer, utilize one of the welding-based deposition system, laser-based deposition system, and plasma powder cladding system to deposit any of the two-dimensional layers of material; and
a machining station operable to remove at least a portion of one or more of the deposited two-dimensional layers of material, the machining station comprising:
a multi-axis milling machine; and
an automatic tool changer associated with the milling machine, the milling machine operable to, when directed by the computer, select from a plurality of machining tools associated with the automatic tool changer for use in the milling machine.

26. The system of claim 25, further comprising an inspection station operable to inspect the three-dimensional part for dimensional accuracy at any time during the fabrication of the three-dimensional part.

27. A system for fabricating a part, comprising:
a computer operable to control the fabrication of a three-dimensional part using digital engineering data;
a deposition station operable to deposit successive two-dimensional layers of material to fabricate the three-dimensional part, the deposition station comprising:
a substrate on which to fabricate the three-dimensional part;
a welding-based deposition system comprising a welding torch;
a laser-based deposition system comprising a laser head and an infrared sensing device operable to sense a molten pool during material deposition by the laser-based deposition system, the infrared sensing device operable to provide feedback to the computer for substantially real-time control of the molten pool;
a plasma powder cladding system comprising a plasma torch; and
a multi-axis robot operable to, when directed by the computer, utilize one of the welding-based deposition system, laser-based deposition system, and plasma powder cladding system to deposit any of the two-dimensional layers of material; and
a machining station operable to remove at least a portion of one or more of the deposited two-dimensional layers of material, the machining station comprising:
a multi-axis milling machine; and
an automatic tool changer associated with the milling machine, the milling machine operable to, when directed by the computer, select from a plurality of machining tools associated with the automatic tool changer for use in the milling machine.

28. The system of claim 27, further comprising an inspection station operable to inspect the three-dimensional part for dimensional accuracy at any time during the fabrication of the three-dimensional part.

* * * * *